US012473186B2

(12) United States Patent
Hayakawa et al.

(10) Patent No.: US 12,473,186 B2
(45) Date of Patent: Nov. 18, 2025

(54) BEVERAGE FILLING SYSTEM AND CIP PROCESSING METHOD

(71) Applicant: DAI NIPPON PRINTING CO., LTD., Tokyo (JP)

(72) Inventors: Atsushi Hayakawa, Tokyo (JP); Takaharu Hirooka, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 24 days.

(21) Appl. No.: 18/259,134

(22) PCT Filed: Dec. 21, 2021

(86) PCT No.: PCT/JP2021/047206
§ 371 (c)(1),
(2) Date: Jun. 23, 2023

(87) PCT Pub. No.: WO2022/138612
PCT Pub. Date: Jun. 30, 2022

(65) Prior Publication Data

US 2024/0051809 A1 Feb. 15, 2024

(30) Foreign Application Priority Data

Dec. 25, 2020 (JP) ................................ 2020-217131

(51) Int. Cl.
*B67C 3/00* (2006.01)

(52) U.S. Cl.
CPC .............. *B67C 3/001* (2013.01); *B67C 3/007* (2013.01)

(58) Field of Classification Search
CPC ................................ B67C 3/001; B67C 3/007
(Continued)

(56) References Cited

U.S. PATENT DOCUMENTS 11,498,823 B2 11/2022 Hayakawa
2010/0037984 A1* 2/2010 Hiroya .................. B67C 7/0073 141/37
(Continued)

FOREIGN PATENT DOCUMENTS

EP 2 361 696 B1 1/2017
JP H08-295396 A 11/1996
(Continued)

OTHER PUBLICATIONS

JP H08295396 A—English Translation (Year: 1996).*
(Continued)

*Primary Examiner* — Craig M Schneider
*Assistant Examiner* — Christopher M Afful
(74) *Attorney, Agent, or Firm* — BURR PATENT LAW, PLLC

(57) ABSTRACT

A beverage filling system for filling a container with a carbonated beverage includes beverage supply piping that supplies the carbonated beverage, a beverage filling machine that is coupled to the beverage supply piping, and a controller that controls the beverage filling system. The beverage filling machine includes a filling nozzle and a beverage supply line, a counter gas line, and a snift line each of which is coupled to the filling nozzle. The controller causes a first piping channel including the beverage supply line to be performed CIP processing, and causes a second piping channel including the counter gas line to be performed CIP processing.

7 Claims, 7 Drawing Sheets

(58) Field of Classification Search
USPC .............................................................. 141/1
See application file for complete search history.

(56) References Cited

U.S. PATENT DOCUMENTS

| | | | |
|---|---|---|---|
| 2016/0121376 | A1 | 5/2016 | Hayakawa et al. |
| 2021/0009396 | A1 | 1/2021 | Hayakawa et al. |
| 2021/0261397 | A1 | 8/2021 | Hayakawa |

FOREIGN PATENT DOCUMENTS

| | | | | | |
|---|---|---|---|---|---|
| JP | H08295396 | | * | 11/1996 | ............... B67C 3/20 |
| JP | 2007-302325 | A | | 11/2007 | |
| JP | 2010-006429 | A | | 1/2010 | |
| JP | 2019-023115 | A | | 2/2019 | |
| JP | 2019-172358 | A | | 10/2019 | |
| JP | 2019-182453 | A | | 10/2019 | |
| JP | 6627918 | B2 | | 1/2020 | |
| JP | 2020-029310 | A | | 2/2020 | |
| JP | 2020-183233 | A | | 11/2020 | |
| WO | 2010/018850 | A1 | | 2/2010 | |
| WO | 2014/208551 | A1 | | 12/2014 | |
| WO | WO-2019189683 | A1 | * | 10/2019 | ............... A61L 2/04 |
| WO | 2019/245019 | A1 | | 12/2019 | |

OTHER PUBLICATIONS

WO2019189683A1—English Translation (Year: 2019).*
Japanese Office Action (Application No. 2023-094222) dated Feb. 2, 2024 (with English translation) (8 pages).
Japanese Office Action (Application No. 2023-094241) dated Feb. 2, 2024 (with English translation) (8 pages).
Japanese Office Action (Application No. 2023-094254) dated Feb. 2, 2024 (with English translation) (7 pages).
Extended European Search Report dated Feb. 7, 2025 (Application No. 21910755.4).
International Search Report and Written Opinion (Application No. PCT/JP2021/047206) dated Mar. 8, 2022 (12 pages).
Japanese Office Action (Application No. 2020-217131) dated Nov. 29, 2022 (with English translation) (8 pages).
English translation of the International Preliminary Report on Patentability (Chapter I) dated Jul. 6, 2023 (Application No. PCT/JP2021/047206).
Chinese Office Action (Application No. 202180087390.9) dated Aug. 29, 2025 (with English translation) (13 pages).

* cited by examiner

BEVERAGE FILLING SYSTEM AND CIP PROCESSING METHOD

TECHNICAL FIELD

The present disclosure relates to a beverage filling system and a CIP processing method.

BACKGROUND ART

To date, it has been practiced that a large number of plastic bottles, which are being conveyed at a high speed, are continuously and aseptically filled with a content such as a carbonated beverage by using a filling machine such as a filler that is provided in a carbonated beverage aseptic filling apparatus. In such a carbonated beverage aseptic filling apparatus, a filling nozzle for filling the plastic bottle with the carbonated beverage is rotatably disposed in an aseptic chamber. (See, for example, PTLs 1 and 2).

CITATION LIST

Patent Literature

PTL 1: Japanese Unexamined Patent Application Publication No. 2007-302325

PTL 2: Japanese Unexamined Patent Application Publication No. 2010-006429

SUMMARY OF INVENTION

Technical Problem

To date, regarding beverage supply piping of a beverage filling apparatus, CIP (Cleaning in Place) processing for cleaning the inside of the beverage supply piping is performed periodically or when switching the type of a product to be produced. Moreover, SIP (Sterilizing in Place) processing for sterilizing the inside of the beverage supply piping is performed. CIP processing is performed by causing a cleaning liquid in which, for example, an alkaline chemical agent such as sodium hydroxide is added to water to flow through a flow path extending from the inside of a pipe line of the beverage supply piping to a filling nozzle of a filling machine, and then causing a cleaning liquid in which an acid chemical agent is added to water to flow through the flow path. SIP processing is processing for sterilizing the inside of the beverage supply piping before starting an operation of filling the product. In SIP processing, for example, sterilization processing at a high temperature is performed by causing heated water vapor or hot water to flow through the beverage supply piping that has been cleaned by the CIP processing.

However, in general, in the vicinity of a filling nozzle of a beverage filling machine for a carbonated beverage, many flow paths are present compared with a filling nozzle for a non-carbonated beverage and have a complex structure. Therefore, the ability of a pump for feeding a cleaning liquid for CIP processing may be insufficient or may be affected by the pressure loss of piping. Thus, it is difficult to fill all flow paths that are present in the vicinity of the filling nozzle simultaneously with the cleaning liquid for CIP processing.

The present disclosure provides a beverage filling system and a CIP processing method with which it is possible to perform CIP processing on a flow path that is present in the vicinity of a filling nozzle of a carbonated beverage filling system efficiently without changing a flow path, a pump, or the like.

Solution to Problem

A carbonated beverage filling system according to one embodiment is a beverage filling system for filling a container with a carbonated beverage, including: beverage supply piping that supplies the carbonated beverage; a beverage filling machine that is coupled to the beverage supply piping; and a controller that controls the beverage filling system. The beverage filling machine includes a filling nozzle and a beverage supply line, a counter gas line, and a snift line each of which is coupled to the filling nozzle. The controller causes a first piping channel including the beverage supply line to be performed CIP processing, and causes a second piping channel including the counter gas line to be performed CIP processing.

In the carbonated beverage filling system according to one embodiment, the controller may cause a third piping channel including the snift line to be performed CIP processing.

In the carbonated beverage filling system according to one embodiment, among the first piping channel, the second piping channel, and the third piping channel, a flow rate of a cleaning liquid that flows through one of the piping channels in which the flow rate is the smallest may be 10% or more and 100% or less of a flow rate of a cleaning liquid that flows through another of the piping channels in which the flow rate is the largest.

The carbonated beverage filling system according to one embodiment may further include CIP circulation piping that is coupled to the beverage filling machine, that feeds a cleaning liquid flowed out from the beverage filling machine during CIP processing toward the beverage supply piping, and that circulates the cleaning liquid, and the cleaning liquid may be heated to a temperature of 85° C. or higher and lower than 100° C.

In the carbonated beverage filling system according to one embodiment, during CIP processing, the controller may monitor whether a temperature of an inlet side of the beverage filling machine and a temperature of an outlet side of the beverage filling machine each maintain a predetermined threshold temperature or higher.

A CIP processing method according to one embodiment is a CIP processing method for performing CIP processing on a beverage filling system for filling a container with a carbonated beverage. The beverage filling system includes beverage supply piping that supplies the carbonated beverage and a beverage filling machine that is coupled to the beverage supply piping. The beverage filling machine includes a filling nozzle and a beverage supply line, a counter gas line, and a snift line each of which is coupled to the filling nozzle. The CIP processing method includes: a first CIP processing step of performing CIP processing on a first piping channel including the beverage supply line; and a second CIP processing step of performing CIP processing on a second piping channel including the counter gas line.

The CIP processing method according to one embodiment may further include a third CIP processing step of performing CIP processing on a third piping channel including the snift line.

With the present disclosure, it is possible to perform CIP processing a flow path that is present in the vicinity of a filling nozzle of a carbonated beverage filling system efficiently without changing a flow path, a pump, or the like.

DESCRIPTION OF EMBODIMENTS

Hereafter, one embodiment will be described with reference to FIGS. 1 to 7. FIGS. 1 to 7 are views illustrating one embodiment. In the following figures, the same portions will be denoted by the same numerals, and detailed descriptions may be partially omitted.

(Beverage Filling System)

First, referring to FIGS. 1 and 2, the configuration of the entirety of a beverage filling system according to the present embodiment will be described.

Figure 1:
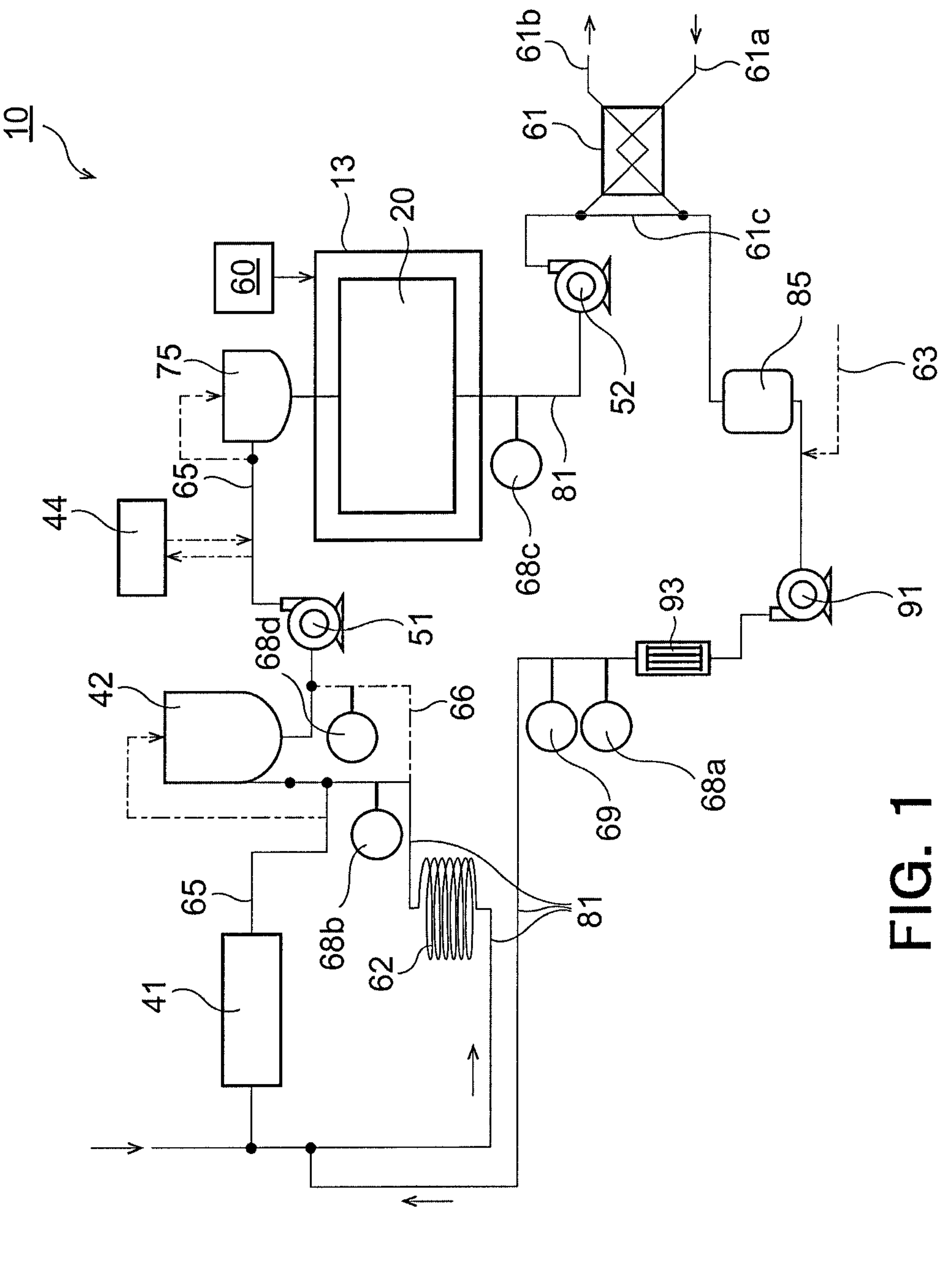
FIG. 1 is a schematic view illustrating the configuration of a beverage filling system according to one embodiment.

A beverage filling system (aseptic filling system) 10 illustrated in FIG. 1 is a system that is used for both of a carbonated beverage and a non-carbonated beverage. That is, the beverage filling system 10 is an aseptic filling system that can fill a bottle (container) 30 (see FIG. 2) selectively with a beverage including a carbonated beverage and a beverage including a non-carbonated beverage. The bottle 30 can be made by biaxial-stretch blow molding a preform made by injection molding a synthetic resin material. It is preferable that a thermoplastic resin, in particular, PE (polyethylene), PP (polypropylene), PET (polyethylene terephthalate), or PEN (polyethylene naphthalate) be used as the material of the bottle 30. Alternatively, the container may be a paper container, a glass bottle, a can, or the like. The container may be a compound container that is a combination of two or more of a plastic container, a paper container, a glass bottle, a can, and the like. In the present embodiment, an example in which a plastic bottle is used as the container will be described.

As illustrated in FIG. 1, the beverage filling system 10 includes a beverage sterilizing device 41, an aseptic tank 42, a carbonated beverage generating unit 44, and a beverage filling machine (filler) 20.

Among these, the beverage sterilizing device 41 sterilizes, for example, a material liquid including a component derived from animals and plants such as a fruit juice or a milk component. The beverage sterilizing device 41 may be, for example, an ultra-high-temperature (UHT) instantaneous sterilizing device.

The aseptic tank 42 temporarily stores a sterilized beverage sterilized by the beverage sterilizing device 41. It is not necessary to provide the aseptic tank 42, and the sterilized beverage from the beverage sterilizing device 41 may be directly supplied to the carbonated beverage generating unit 44 or a beverage filling tank 75.

A first pump 51 is provided between the aseptic tank 42 and the beverage filling tank 75. The first pump 51 feeds a liquid such as a beverage from the aseptic tank 42 toward the beverage filling tank 75. Without providing the first pump 51, a liquid such as a beverage may be fed toward the beverage filling tank 75 by using a pressure from the aseptic tank 42.

The carbonated beverage generating unit 44 is used when filling a container with a carbonated beverage by using the beverage filling machine 20. The carbonated beverage generating unit 44 produces an aseptic carbonated beverage by injecting carbon dioxide gas into a beverage from the beverage sterilizing device 41 and thereby dissolving the carbon dioxide gas in the beverage. The carbonated beverage generating unit 44 may include, for example, a beverage cooling device and a carbonator.

The beverage sterilizing device 41, the aseptic tank 42, the carbonated beverage generating unit 44, and the beverage filling machine 20 are coupled by beverage supply piping 65. The beverage supply piping 65 is piping that supplies a beverage to the beverage filling machine 20, and the beverage sequentially passes through the inside of the beverage supply piping 65. When CIP processing described below is performed, a cleaning liquid passes through the inside of the beverage supply piping 65.

CIP circulation piping 81 is coupled to the beverage filling machine 20. The CIP circulation piping 81 is a line that feeds a cleaning liquid flowed out from the beverage filling machine 20 during CIP processing toward the beverage supply piping 65 and that circulates the cleaning liquid. The CIP circulation piping 81 couples the beverage filling machine 20 and a middle part of the beverage supply piping 65. In the CIP circulation piping 81, a second pump 52, a heat exchanger 61, a CIP tank 85, a third pump 91, a heater 93, and a holding tube 62 are provided in order from the beverage filling machine 20 side.

The second pump 52 feeds the cleaning liquid from the beverage filling machine 20 toward the CIP tank 85 or toward an outlet flow path 61*b* of the heat exchanger 61 described below.

The heat exchanger 61 is provided between the second pump 52 and the CIP tank 85. The heat exchanger 61 has an inlet flow path 61*a*, into which a liquid such as aseptic water flows during cleaning of the beverage filling system 10, and the outlet flow path 61*b*, through which a liquid waste from the beverage filling machine 20 flows out. The temperature of the liquid such as aseptic water supplied from the inlet flow path 61*a* rises while exchanging heat inside of the heat exchanger 61 with a high-temperature liquid waste from the beverage filling machine 20. Thus, it is possible to reduce energy required by the heater 93 to increase the temperature of a cleaning liquid including aseptic water and the like. When the cleaning liquid is circulated in the CIP circulation piping 81, the cleaning liquid flows through a heat exchanger bypass flow path 61*c* that bypasses the heat exchanger 61.

The CIP tank 85 temporarily stores a cleaning liquid from the beverage filling machine 20. A cleaning liquid supply source 63, which supplies an alkaline cleaning liquid to the CIP circulation piping 81, is connected between the CIP tank 85 and the third pump 91. The third pump 91 feeds the cleaning liquid from the CIP tank 85 toward the heater 93. Instead of an alkaline cleaning liquid, the cleaning liquid supply source 63 may supply another cleaning liquid such as an acid cleaning liquid, a deodorant, or the like.

The heater 93 heats a cleaning liquid that flows through the CIP circulation piping 81. For example, a plate heat exchanger or a shell-and-tube heat exchanger can be used as the heater 93. The heater 93 heats the cleaning liquid to, for example, 80° C. or higher and 150° or lower, or 85° C. or higher and 100° C. or lower, preferably 90° C. or higher and lower than 100° C., and more preferably 95° C. or higher and lower than 100° C.

The holding tube 62 is provided in the CIP circulation piping 81 between the heater 93 and a connection portion where the CIP circulation piping 81 and the beverage supply piping 65 are connected. The holding tube 62 includes a coil-shaped curved tube, a straight tube, a spiral tube, and the like, and performs heat processing or sterilization processing while a cleaning liquid flows therethrough. The cleaning liquid is set in such a way as to pass through the holding tube 62 while spending a predetermined residence time or longer. In this way, the cleaning liquid resides in the holding tube 62 for a certain residence time (holding time) while maintaining a sterilization temperature, and thus the sterility of the cleaning liquid can be ensured.

A bypass flow path 66 is provided between the holding tube 62 and the first pump 51. The bypass flow path 66 couples the CIP circulation piping 81 on the outlet side of the holding tube 62 (on the inlet side of the aseptic tank 42) and the beverage supply piping 65 on the outlet side of the aseptic tank 42. The bypass flow path 66 causes the cleaning liquid to flow from the holding tube 62 side to the beverage supply piping 65 on the outlet side of the aseptic tank 42 without causing the cleaning liquid to pass through the aseptic tank 42. Thus, it is possible to clean and sterilize the aseptic tank 42 independently from other elements of the beverage supply piping 65. For example, during CIP processing described below, while causing a heated cleaning liquid to flow from the holding tube 62 side to the first pump 51 side via the bypass flow path 66, it is possible to perform the CIP processing on the aseptic tank 42 by using another cleaning liquid that has passed through the beverage sterilizing device 41.

Thermometers 68*a* to 68*d* and a flowmeter 69 are disposed in the beverage supply piping 65 and the CIP circulation piping 81. The thermometers 68*a* to 68*d* each measure the temperature of a liquid that flows in each piping. The flowmeter 69 measures the flow rate of the liquid that flows in each piping. To be specific, in the CIP circulation piping 81, the thermometer 68*a* and the flowmeter 69 are disposed on the outlet side of the heater 93, and a thermometer 68*b* is disposed on the outlet side of the holding tube 62. In the beverage supply piping 65, the thermometer 68*c* is disposed on the outlet side of the beverage filling machine 20. Moreover, the thermometer 68*d* is disposed in the bypass flow path 66.

A controller 60 controls all or part of the beverage filling system 10. The controller 60 may include a plurality of controllers that independently control the elements of the beverage filling system 10.

Figure 2:
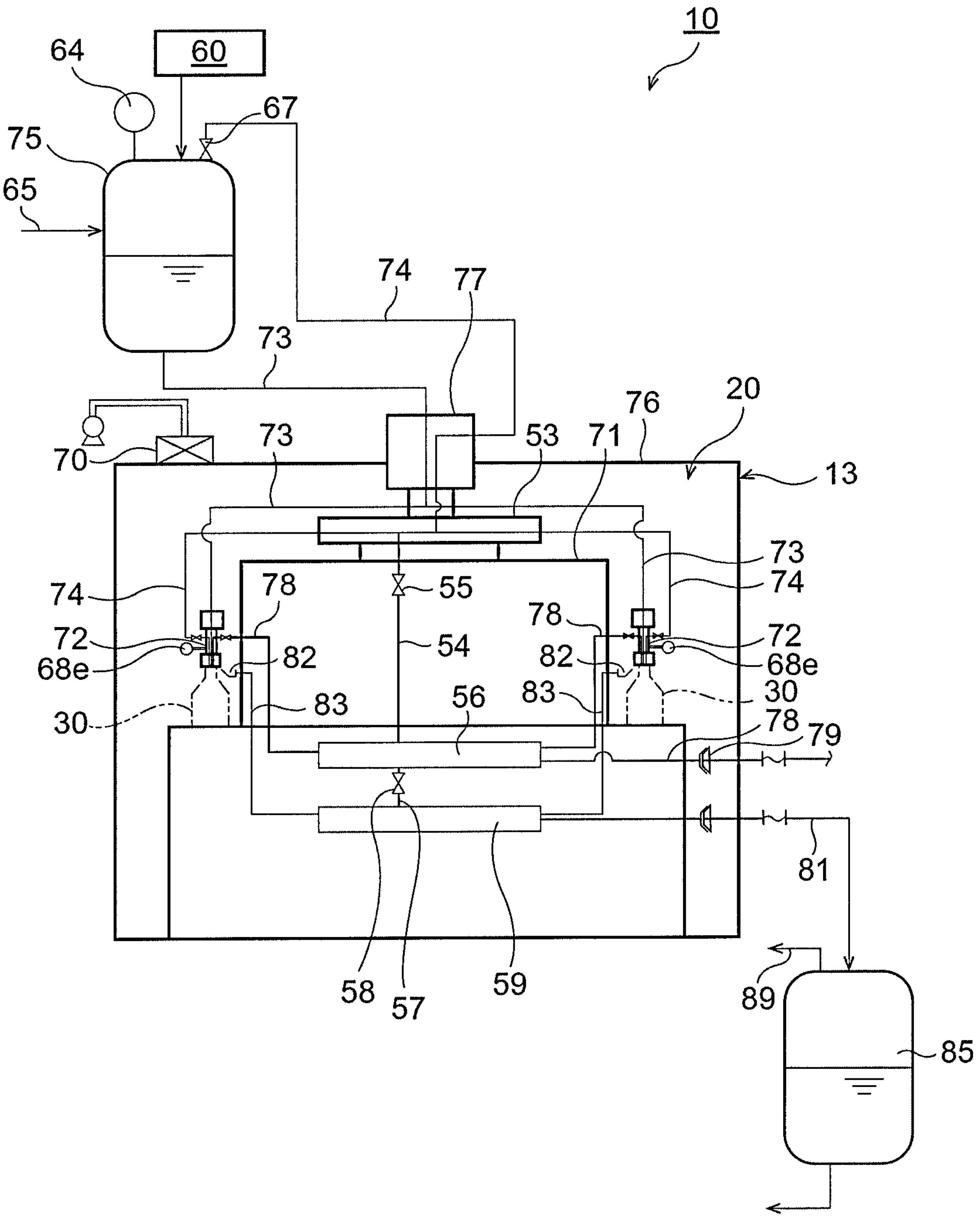
FIG. 2 is a schematic view illustrating the flow of a fluid in a beverage filling machine of the beverage filling system according to one embodiment and in the vicinity thereof.

As illustrated in FIG. 2, the beverage filling machine 20 fills the bottle 30 from the mouth of the bottle 30 with an aseptic carbonated beverage or an aseptic non-carbonated beverage that has been sterilized beforehand or an unsterilized carbonated beverage that does not need to be sterilized (hereafter, simply referred to as "beverage"). In the beverage filling machine 20, the bottle 30 in an empty state is filled with the beverage. In the beverage filling machine 20, while a plurality of bottles 30 are rotated (revolved), the inside of each of the bottles 30 is filled with the beverage.

In a case where the beverage with which the bottle 30 is to be filled is a carbonated beverage (an aseptic carbonated beverage or an unsterilized carbonated beverage), the bottle 30 is filled with the carbonated beverage at a filling temperature of 1° C. or higher and 40° C. or lower, and preferably 5° C. or higher and 10° C. or lower. In this way, the filling temperature of the carbonated beverage is set at, for example, 1° C. or higher and 10° C. or lower, because carbon dioxide gas tends to escape from the carbonated beverage if the liquid temperature of the carbonated beverage becomes higher than 10° C. Examples of a carbonated beverage with which a container is to be filled by the beverage filling machine 20 include various beverages including carbon dioxide gas, which are, for example, carbonated soft drinks such as cider, cola, and the like, and alcohol drinks such as beer.

In a case where the drink with which the bottle 30 is to be filled is an aseptic non-carbonated beverage, the bottle 30 is filled with the non-carbonated beverage at a filling temperature of 1° C. or higher and 40° C. or lower, and preferably 10° C. or higher and 30° C. or lower. Examples of an aseptic non-carbonated beverage with which a container is to be filled by the beverage filling machine 20 include a non-carbonated beverage including a component derived from animals and plants, such as a fruit juice or a milk component, and mineral water or the like that does not include a component derived from animals and plants.

The beverage filling system 10 has an aseptic chamber 13 whose inside is maintained in an aseptic state. The beverage filling machine 20 is provided in the aseptic chamber 13. The beverage filling tank (a filling head tank, a buffer tank) 75 is disposed at a position that is outside of the aseptic chamber 13 and above the beverage filling machine 20. The inside of the beverage filling tank 75 is filled with a beverage. The pressure P1 of the inside of the beverage filling tank 75 is measured by a first pressure gauge 64 provided on the beverage filling tank 75. The beverage filling tank 75 need not be set above the beverage filling machine 20, and may be set on a floor on which the beverage filling machine 20 is set.

The beverage supply piping 65 described above is coupled to the beverage filling tank 75. As illustrated in FIG. 1, the CIP circulation piping 81 is coupled to the beverage supply piping 65.

A beverage supply line 73 is coupled to the beverage filling tank 75. The beverage supply line 73 supplies a beverage with which the beverage filling tank 75 is filled toward a filling nozzle 72 described below. The beverage filling tank 75 is coupled to the filling nozzle 72 via the beverage supply line 73.

Moreover, a counter gas line 74 is coupled to the beverage filling tank 75. The counter gas line 74 is used in a case where a beverage with which a container is to be filled is a carbonated beverage, and supplies aseptic carbon dioxide gas with which the beverage filling tank 75 is filled toward the filling nozzle 72 described below. The beverage filling tank 75 is coupled to the filling nozzle 72 via the counter gas line 74.

A counter gas valve 67 is provided at a connection portion between the beverage filling tank 75 and the counter gas line 74. The counter gas valve 67 is directly connected to the beverage filling tank 75. The counter gas valve 67 is opened when a beverage with which a container is to be filled is a carbonated beverage, and is closed when the beverage is a non-carbonated beverage.

In the beverage filling machine 20, the bottle 30 in an empty state is filled with a beverage with which the beverage filling tank 75 has been filled. The beverage filling machine 20 has a conveyance wheel 71 that rotates around an axis parallel to the vertical direction. While a plurality of bottles 30 are rotated (revolved) by the conveyance wheel 71, the inside of each of the bottles 30 is filled with the beverage. A plurality of filling nozzles 72 are arranged along the outer periphery of the conveyance wheel 71. One bottle 30 is attached to each filling nozzle 72, and the beverage is injected from the filling nozzle 72 to the inside of the bottle 30. The configuration of the filling nozzle 72 will be described below.

The conveyance wheel 71, the filling nozzle 72, at least a part of the beverage supply line 73, and at least a part of the counter gas line 74 are surrounded by a cover 76 that constitutes a part of the aseptic chamber 13. A rotary joint 77 is attached to an upper part of the cover 76. The beverage supply line 73 and the counter gas line 74 are attached to the cover 76 of the aseptic chamber 13 by the rotary joint 77. The rotary joint 77 aseptically seals rotational bodies (the conveyance wheel 71, the filling nozzle 72, and rotary piping and the like of the beverage supply line 73 and the counter gas line 74) and non-rotational bodies (the cover 76, and fixed piping and the like of the beverage supply line 73 and the counter gas line 74).

The beverage supply line 73 and the counter gas line 74 are coupled to each filling nozzle 72. During filling with a beverage, one end of the beverage supply line 73 is coupled to the beverage filling tank 75 filled with the beverage and the other end of the beverage supply line 73 communicates with the inside of the bottle 30. The beverage supplied from the beverage filling tank 75 passes through the beverage supply line 73, and is injected to the inside of the bottle 30.

During filling with a beverage, one end of the counter gas line 74 is coupled to the beverage filling tank 75 and the other end of the counter gas line 74 communicates with the inside of the bottle 30. A counter pressure gas, which is aseptic carbon dioxide gas supplied from the beverage filling tank 75, passes through the counter gas line 74, and the inside of the bottle 30 is filled with the counter pressure gas. A counter manifold (counter gas branching portion) 53 is provided at a middle part of the counter gas line 74. The counter gas line 74 from the beverage filling tank 75 branches at the counter manifold 53 into a plurality of lines each of which extends to a corresponding filling nozzle 72.

Moreover, a snift line 78 is coupled to each filling nozzle 72. The snift line 78 is used when a beverage with which a container is to be filled is a carbonated beverage. One end of the snift line 78 is coupled to the counter gas line 74, and the other end of the snift line 78 extends to the outside of the aseptic chamber 13. A gas inside of the bottle 30 can be discharged via the snift line 78. A snift manifold (snift line branching portion) 56 is provided at a middle part of the snift line 78. Carbon dioxide gas from the snift line 78 is gathered in the snift manifold 56 and discharged into the aseptic chamber 13. A discharge valve 79 is provided in the snift line 78 in the aseptic chamber 13. Due to the discharge valve 79, carbon dioxide gas from the snift line 78 is discharged into the aseptic chamber 13. In this way, carbon dioxide gas from the snift line 78 is discharged into the aseptic chamber 13 by using the discharge valve 79. Thus, carbon dioxide gas in the bottle 30 can be discharged into the aseptic chamber 13, which is an aseptic space, without allowing contamination with bacteria. The snift manifold 56 and the counter manifold 53 are coupled by a first bypass line 54. A first valve 55 is provided in the first bypass line 54, and the first valve 55 is normally closed. Without providing the discharge valve 79 in the snift line 78, the snift line 78 may be connected to the rotary joint 77 and carbon dioxide gas may be discharged from the rotary joint 77 to the outside of the aseptic chamber 13. In the case illustrated in the figures, the rotary joint 77 is provided at an upper part of the beverage filling machine 20. This is not a limitation, and the rotary joint 77 may be set at a lower part of the beverage filling machine 20. A rotary joint may be provided at each of an upper part and a lower part of the beverage filling machine 20.

It is preferable that a flow path, in the beverage filling system 10, through which a beverage passes be performed CIP (Cleaning in Place) processing periodically or when switching the type of beverage. CIP processing is performed by causing an acid cleaning liquid to flow through a flow path after causing an alkaline cleaning liquid to flow through the flow path or before causing the alkaline cleaning liquid to flow through the flow path. An alkaline cleaning liquid is water to which an alkaline chemical agent that is a mixture of caustic soda (sodium hydroxide), potassium hydroxide, sodium carbonate, sodium silicate, sodium phosphate, sodium hypochlorite, a surface-active agent, chelating agent, and the like is added. An acid cleaning liquid is water to which an acid chemical agent such as a nitric-acid agent or a phosphoric-acid agent is added. An alkaline cleaning step using the alkaline cleaning liquid and an acid cleaning step using the acid cleaning liquid may be freely combined and performed. Thus, residues of a previous beverage and the like, which have adhered to the inside of flow paths through which a beverage is to pass, are removed. Optionally, SIP (Sterilizing in Place) processing may be performed. SIP processing is processing that is performed before starting an operation of filling a container with a beverage in order to sterilize the inside of a flow path through which the beverage is to pass, and is performed by, for example, causing heat steam or hot water to flow through a flow path that has been cleaned by the CIP processing described above. Thus, the flow path through which the beverage is to pass is sterilized to be in an aseptic state.

In order to perform CIP processing described above, a CIP cup 82 that receives a cleaning liquid from the filling nozzle 72 is provided in the vicinity of the filling nozzle 72. A CIP line 83 is coupled to the CIP cup 82. One end of the CIP line 83 is coupled to the CIP cup 82, and the other end of the CIP line 83 is coupled to the CIP tank 85 disposed outside of the aseptic chamber 13. It is possible to discharge a cleaning liquid from the filling nozzle 72 to the CIP tank 85 via the CIP line 83. The CIP line 83 is coupled to a CIP manifold (CIP line branching portion) 59, and the CIP manifold 59 is coupled to the CIP circulation piping 81. A cleaning liquid from the CIP line 83 is collectively recovered in the CIP manifold 59 and discharged to the CIP tank 85 via the CIP circulation piping 81. The CIP manifold 59 and the snift manifold 56 are coupled by a second bypass line 57. A second valve 58 is provided in the second bypass line 57. The second valve 58 is normally closed.

An exhaust line 89 that discharges a gas inside of the CIP tank 85 is provided on an upper part of the CIP tank 85. A scrubber (not shown) that treats the gas is coupled to the exhaust line 89.

An aseptic air supply device 70 that feeds a large volume of aseptic air into the aseptic chamber 13 is provided on the cover 76 of the aseptic chamber 13. The aseptic air supply device 70 introduces aseptic air into the aseptic chamber 13. Thus, the inside of the aseptic chamber 13 and the aseptic area of the beverage filling machine 20 are all maintained at a positive pressure, and entry of external air into the aseptic chamber 13 is suppressed. A large volume of aseptic air is fed into the aseptic chamber 13 by the aseptic air supply device 70. Thus, even in a case where carbon dioxide gas is discharged into the aseptic chamber 13 from the discharge valve 79 as described above, the carbon dioxide gas concentration in the aseptic chamber 13 is not likely to increase excessively. The supply rate of aseptic air for achieving the above object is 5 $m^3$/min or greater and 100 $m^3$/min or less, and preferably 10 $m^3$/min or greater and 50 $m^3$/min or less.

(Filling Nozzle)

Figure 3:
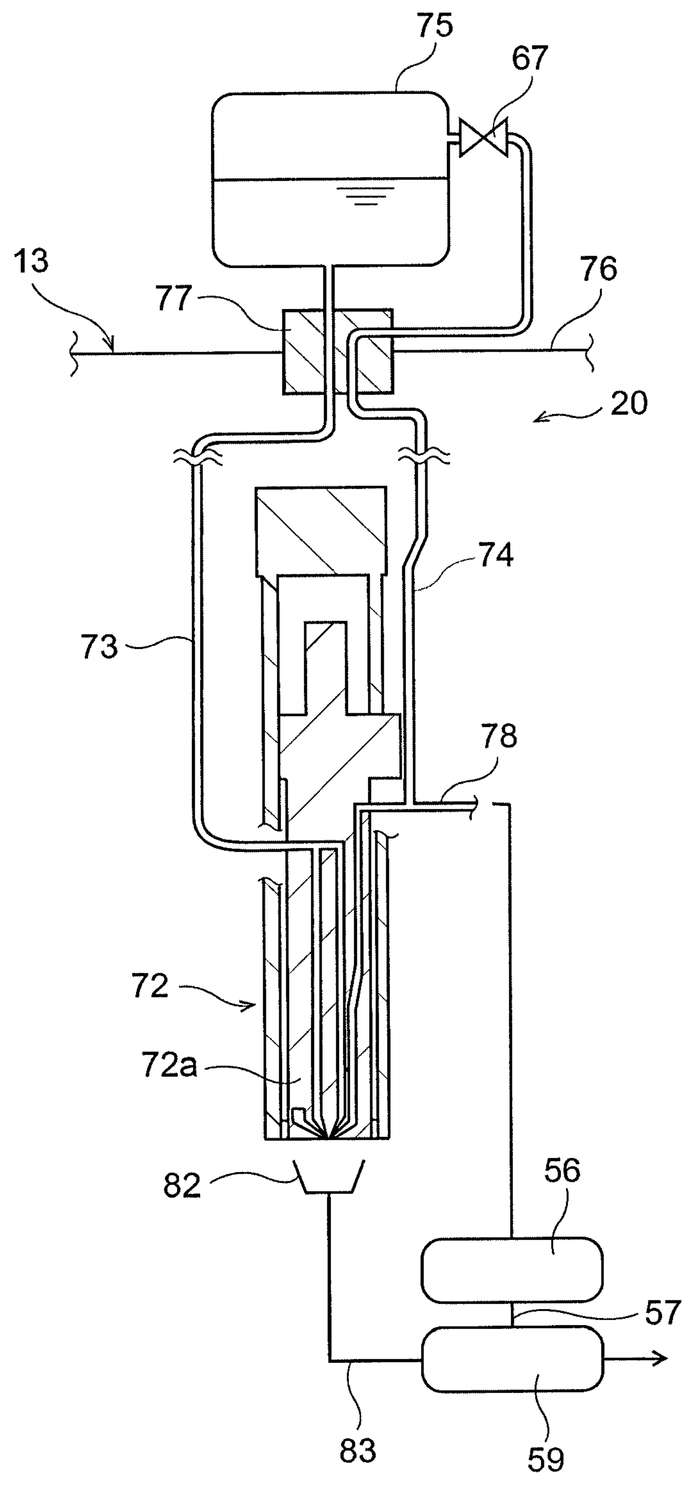
FIG. 3 is a schematic sectional view illustrating a filling nozzle of the beverage filling machine of the beverage filling system according to one embodiment.

Next, referring to FIG. 3, the configuration of the filling nozzle 72 of the beverage filling machine 20 will be described. FIG. 3 illustrates the filling nozzle 72 during CIP processing, and the CIP cup 82 is disposed below the filling nozzle 72.

As illustrated in FIG. 3, the filling nozzle 72 has a body portion 72*a*. The beverage supply line 73 and the counter gas line 74 are each coupled to the body portion 72*a*. The beverage supply line 73 and the counter gas line 74 extend through the rotary joint 77 provided on the cover 76.

An upper end of the beverage supply line 73 is coupled to the beverage filling tank 75, and a lower end of the beverage supply line 73 is open toward the CIP cup 82. A cleaning liquid supplied from the beverage filling tank 75 passes through the beverage supply line 73 and flows to the inside of the CIP cup 82. The cleaning liquid flowed to the inside of the CIP cup 82 flows into the CIP manifold 59 via the CIP line 83. Subsequently, the cleaning liquid is discharged from the CIP manifold 59 to the outside of the beverage filling machine 20.

The counter gas line 74 is used when a beverage with which a container is to be filled is a carbonated beverage. An upper end of the counter gas line 74 is coupled to the beverage filling tank 75, and a lower end of the counter gas line 74 is open toward the CIP cup 82. The snift line 78 is coupled a middle part of the counter gas line 74. A cleaning liquid supplied from the beverage filling tank 75 passes through the counter gas line 74 and flows to the inside of the CIP cup 82. Alternatively, a cleaning liquid supplied from the beverage filling tank 75 flows into the snift manifold 56 via the snift line 78. Subsequently, the cleaning liquid from the snift manifold 56 passes through the snift line 78, and then is discharged into the aseptic chamber 13 from the discharge valve 79. The snift line 78 may discharge the cleaning liquid to the outside of the beverage filling machine 20 (not shown) from the rotary joint 77 positioned at an upper part of the beverage filling machine 20. A rotary joint may be additionally provided at a lower part of the beverage filling machine 20 to discharge the cleaning liquid from the snift line 78 to the outside of the beverage filling machine 20 (not shown).

(Aseptic Carbonated Beverage Filling Method)

Next, an aseptic carbonated beverage filling method using the beverage filling system 10 will be described. Hereafter, an aseptic carbonated beverage filling method in normal time, that is, an aseptic carbonated beverage filling method for filling the bottle 30 with an aseptic carbonated beverage to produce a product bottle will be described.

First, an empty bottle 30 that has been sterilized is conveyed to the beverage filling machine 20. In the beverage filling machine 20, while the bottle 30 is rotated (revolved), the bottle 30 is filled with an aseptic carbonated beverage from the mouth of the bottle 30. In the beverage filling machine 20, the sterilized bottle 30 is filled with the aseptic carbonated beverage fed from the beverage filling tank 75 at a filling temperature of 1° C. or higher and 40° C. or lower, and preferably 5° C. or higher and 10° C. or lower.

During this time, in the beverage filling machine 20, the filling nozzle 72 is in close contact with the mouth of the bottle 30, and the counter gas line 74 and the bottle 30 communicate with each other. At this time, the snift line 78 is closed. Next, aseptic carbon dioxide gas for counter pressure is supplied from the beverage filling tank 75 to the inside of the bottle 30 via the counter gas line 74. Thus, the internal pressure of the bottle 30 is increased to a level higher than the atmospheric pressure, and the internal pressure of the bottle 30 becomes the same as the internal pressure of the beverage filling tank 75.

Next, the inside of the bottle 30 is filled with the aseptic carbonated beverage from the beverage supply line 73. In this case, the aseptic carbonated beverage from the beverage filling tank 75 passes through the beverage supply line 73, and is injected to the inside of the bottle 30.

Subsequently, supply of the aseptic carbonated beverage from the beverage supply line 73 is stopped. Next, the beverage supply line 73 and the counter gas line 74 are closed, the snift line 78 is opened, and the gas inside of the bottle 30 is discharged from the snift line 78. Thus, the internal pressure of the bottle 30 becomes the same as the atmospheric pressure, and filling of the bottle 30 with the aseptic carbonated beverage is finished. At this time, the gas from the bottle 30 passes through the snift line 78, and then is discharged from the discharge valve 79 into the aseptic chamber 13. Next, the filling nozzle 72 separates from the mouth of the bottle 30, and the bottle 30 is conveyed to a capper (not shown).

Subsequently, a cap (not shown) is put on the bottle 30, which has been filled with the aseptic carbonated beverage by the beverage filling machine 20, thereby obtaining a product bottle.

It is preferable that the production (conveyance) speed of the bottle 30 in the beverage filling system 10 be 100 bpm or faster and 1500 bpm or slower. Here, the term "bpm (bottle per minute)" refers to the conveyance speed of the bottle 30 per one minute.

(Aseptic Non-Carbonated Beverage Filling Method)

Next, an aseptic non-carbonated beverage filling method using the beverage filling system 10 will be described. Hereafter, an aseptic non-carbonated beverage filling method in normal time, that is, an aseptic non-carbonated beverage filling method for filling the bottle 30 with a non-aseptic carbonated beverage to produce a product bottle will be described.

First, an empty bottle 30 that has been sterilized is conveyed to the beverage filling machine 20. Next, in the beverage filling machine 20, in a state in which the filling nozzle 72 is not in close contact with the mouth of the bottle 30, the inside of the bottle 30 is filled with an aseptic non-carbonated beverage from the beverage supply line 73. The aseptic non-carbonated beverage from the beverage filling tank 75 passes through the beverage supply line 73 and is injected to the inside of the bottle 30. Subsequently, supply of the aseptic non-carbonated beverage from the beverage supply line 73 is stopped. At this time, the counter gas line 74 and the snift line 78 are respectively closed by the counter gas valve 67 and another valve (not shown).

A cap (not shown) is put on the bottle 30, which has been filled with the non-aseptic carbonated beverage by the beverage filling machine 20, thereby obtaining a product bottle.

(CIP Processing Method)

Next, an operation of CIP (Cleaning in Place) processing that is performed in the beverage filling system 10, for example, periodically or when switching the type of beverage will be described. Control of CIP processing described below is controlled by the controller 60.

First, water is fed into the CIP circulation piping 81 from the inlet flow path 61*a* of the heat exchanger 61. As the water circulates, the inside of the CIP circulation piping 81, the inside of the beverage supply piping 65, and the inside of the beverage filling machine 20 are each cleaned.

Figure 4:
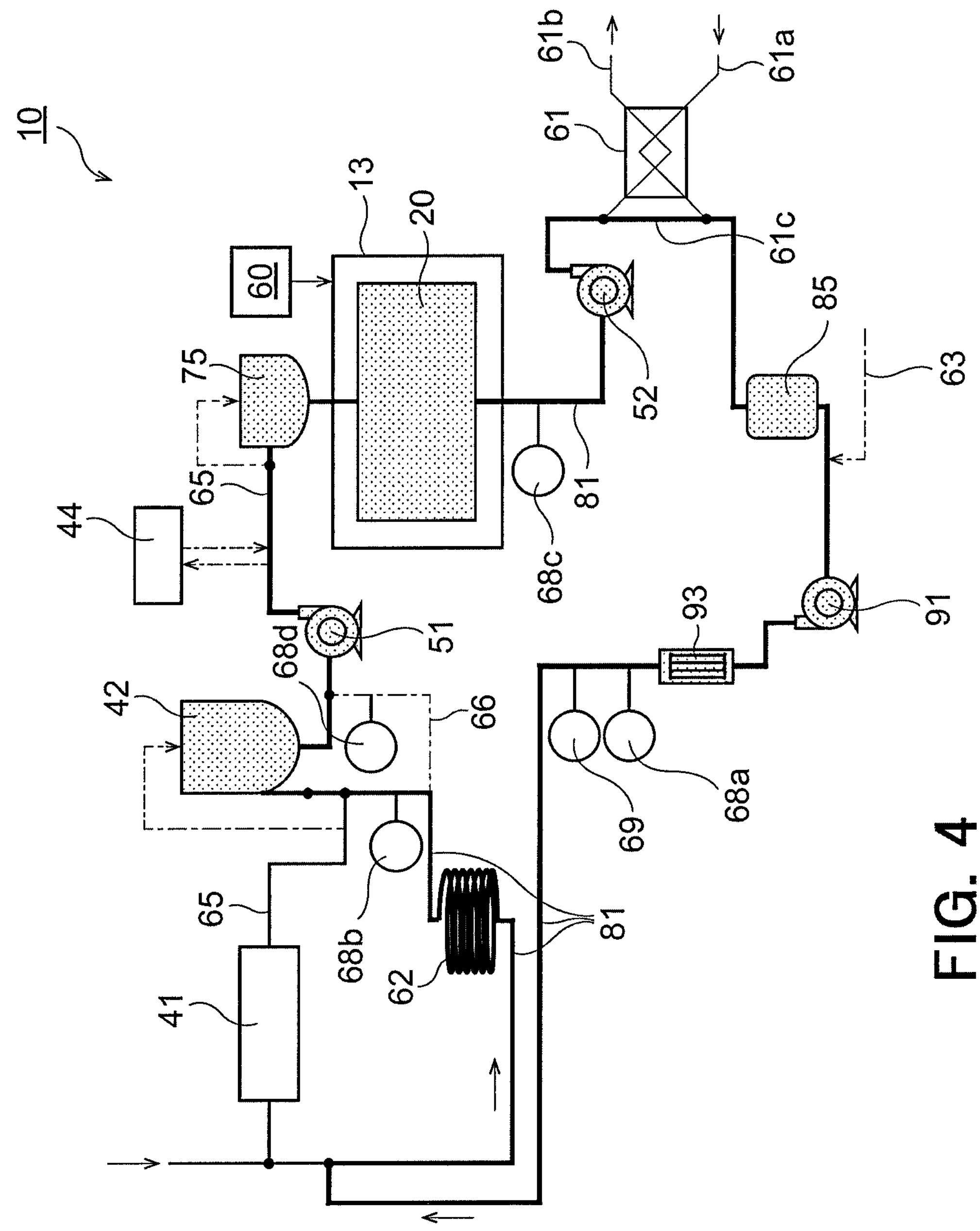
FIG. 4 is a schematic view of flow paths of the beverage filling system to be CIP cleaned.

Next, as illustrated in FIG. 4, an alkaline cleaning liquid is fed from the cleaning liquid supply source 63. As the alkaline cleaning liquid circulates, the inside of the CIP circulation piping 81, the inside of the beverage supply piping 65, and the inside of the beverage filling machine 20 are cleaned. In FIG. 4, flow paths through which the alkaline cleaning liquid passes are represented by thick lines and hatchings.

During this time, the alkaline cleaning liquid is fed into the heater 93 by the third pump 91 located in the CIP circulation piping 81. The alkaline cleaning liquid is heated in the heater 93 to, for example, 85° C. or higher and 100° C. or lower, preferably 90° C. or higher and lower than 100° C., and more preferably 95° C. or higher and lower than 100° C. The heated alkaline cleaning liquid reaches the beverage supply piping 65 via the holding tube 62. Next, the heated alkaline cleaning liquid reaches the beverage filling machine 20 sequentially via the aseptic tank 42, the first pump 51, and the beverage filling tank 75. Subsequently, the alkaline cleaning liquid flows out from the beverage filling machine 20 to the CIP circulation piping 81, and is fed to the heater 93 again sequentially via the second pump 52, the CIP tank 85, and the third pump 91. In this way, after circulating the alkaline cleaning liquid to clean the inside of the CIP circulation piping 81, the inside of the beverage supply piping 65, and the inside of the beverage filling machine 20 for a predetermined time, the alkaline cleaning liquid is discharged to the outside from the outlet flow path 61*b* of the heat exchanger 61.

In a case where a liquid including sodium hydroxide or potassium hydroxide by 0.1 mass % or more and 10 mass % or less is used as the alkaline cleaning liquid, the alkaline cleaning liquid is heated to the aforementioned temperature by the heater 93 provided in the CIP circulation piping 81. The heated alkaline cleaning liquid is supplied to each of the CIP circulation piping 81, the beverage supply piping 65, and the beverage filling machine 20. When the circulation is performed for, for example, about 5 minutes or longer and 60 minutes or shorter, the CIP circulation piping 81, the beverage supply piping 65, and the beverage filling machine 20 are each appropriately cleaned. At the same time, the CIP circulation piping 81, the beverage supply piping 65, and the beverage filling machine 20 are each sterilized, and thus SIP processing is simultaneously performed without additionally performing SIP processing (CSIP processing). In this way, sterilization is performed simultaneously with CIP processing for cleaning various devices of the beverage filling system 10. Thus, the time required to perform SIP processing can be reduced, or SIP processing itself can be omitted. Thus, it is possible to reduce the product switching time of the beverage filling system 10 and to increase the production capacity.

Next, in a similar way, an acid cleaning liquid is caused to flow through the CIP circulation piping 81, the beverage supply piping 65, and the beverage filling machine 20 to acid-clean the entirety of the CIP circulation piping 81, the beverage supply piping 65, and the beverage filling machine 20. Subsequently, aseptic water is caused to flow through all of the CIP circulation piping 81, the beverage supply piping 65, and the beverage filling machine 20 to rinse the entirety of the CIP circulation piping 81, the beverage supply piping 65, and the beverage filling machine 20. In this way, residues of a previous beverage and the like, which have adhered to the inside of flow paths through which a beverage is to pass, are removed. The acid cleaning liquid is heated in the heater 93 provided in the CIP circulation piping 81 to, for example, 85° C. or higher and 100° C. or lower, preferably 90° C. or higher and lower than 100° C., and more preferably 95° C. or higher and lower than 100° C. The heated acid cleaning liquid is supplied to each of the CIP circulation piping 81, the beverage supply piping 65, and the beverage filling machine 20. When the circulation is performed, for example, 5 minutes or longer and 30 minutes or shorter, the CIP circulation piping 81, the beverage supply piping 65, and the beverage filling machine 20 are each appropriately cleaned. At the same time, the CIP circulation piping 81, the beverage supply piping 65, and the beverage filling machine 20 are each sterilized, and thus SIP processing is performed without additionally performing SIP processing (CSIP processing). The order of using the acid cleaning liquid and using the alkaline cleaning liquid may be determined as appropriate in view of cleaning performance, and, for example, acid cleaning may be performed first and alkaline cleaning may be performed next. Alternatively, only alkaline cleaning may be performed, or only acid cleaning may be performed.

After finishing CIP processing, the cleaning liquid used for the CIP processing is discharged from the CIP circulation piping 81, and the cleaning liquid that remains in the beverage supply piping 65 and the CIP circulation piping 81 is washed away by using aseptic water. At the time when the cleaning liquid in the beverage supply piping 65 and the CIP circulation piping 81 is removed by using the aseptic water and all cleaning liquid in the filling nozzle 72 of the beverage filling machine 20 is replaced with aseptic water, feeding of aseptic water to the beverage supply piping 65 and the CIP circulation piping 81 is stopped. Simultaneously with or subsequently to this, while removing aseptic water that remains in the aseptic tank 42 and the beverage filling tank 75, aseptic air is supplied into the beverage supply piping 65 including the aseptic tank 42 and the beverage filling tank 75. Thus, the inside of each of the aseptic tank 42, the beverage filling tank 75, the beverage supply piping 65, and the CIP circulation piping 81, which have been performed the CIP processing, is maintained at a positive pressure to maintain sterility. Subsequently, while maintaining the positive pressure, aseptic water that has accumulated in the aseptic tank 42, the beverage supply piping 65, the beverage filling tank 75, and the beverage filling machine 20 may be air-blown to remove the aseptic water from a drain line (not shown) provided at each place. Thus, it is possible to reduce the risk that a beverage with which a container is to be filled might be diluted at the start of production.

After rinsing has finished, a beverage is stored in the aseptic tank 42, next the beverage passes through the beverage supply piping 65 and reaches the beverage filling machine 20, and a production step of performing an operation of filling the bottle 30 with the beverage is started.

(CIP Cleaning Liquid Heating Method)

Next, a CIP cleaning liquid heating method for heating an alkaline cleaning liquid or an acid cleaning liquid (hereafter, referred to as "CIP cleaning liquid") during the CIP processing will be described.

As described above, the CIP cleaning liquid is fed into the heater 93 of the CIP circulation piping 81 and heated in the heater 93 to, for example, 85° C. or higher and lower than 100° C., preferably 90° C. or higher and lower than 100° C., and more preferably 95° C. or higher and lower than 100° C.

The heated CIP cleaning liquid is supplied to the beverage supply piping 65 via the holding tube 62. The CIP cleaning liquid requires a certain time (residence time) or longer to pass through the holding tube 62, and maintains a predetermined temperature or higher during this time.

The degree of sterilization of the cleaning liquid that passes through the holding tube 62 may be controlled by using an F-value. For example, while causing the CIP cleaning liquid to flow through the holding tube 62, the temperature of the CIP cleaning liquid may be measured by using the thermometer 68*b* disposed on the outlet side of the holding tube 62. In this case, temperature information from the thermometer 68*b* is sent to the controller 60 at certain time intervals. The controller 60 calculates an F-value at the time based on the temperature information from the thermometer 68*b*. Here, the term "F-value" refers to a heating time required to kill all bacteria when the bacteria are heated for a certain time. The F-value, which is represented by the lethal time of bacteria, is calculated by using the following formula.

$$F=\int_0^{t1} 10^{(T-T_r)/Z}dt \quad \text{[Math 1]}$$

In the above formula, T is a temperature (° C.) measured by the thermometer 68*b*, 10^{(T−Tr)/Z} is lethality at the sterilization temperature T, Tr is a reference temperature (° C.), and Z is a Z-value (° C.). $t_1$ (minutes) is the (shortest) residence time required by the CIP cleaning liquid to pass through the holding tube 62, and is set beforehand as a predetermined value. Alternatively, t1 (minutes) may be an actual passing time of the cleaning liquid that is a value measured in real time from the volume of the flowmeter 69 and the holding tube 62.

The controller 60 monitors the F-value calculated based on the temperature of the thermometer 68*b* on the outlet side and continues CIP processing if this value maintains a predetermined value or greater. That is, the controller 60 integrates the value of 10^{(T−Tr)/Z} based on temperature information that is sent from the thermometer 68*b* at certain time intervals. The integrated value in an interval between the present time and $t_1$ (minutes) immediately before the present time is determined as the F-value at the time. If the F-value maintains a predetermined value or greater, the controller 60 determines that the sterility of the CIP cleaning liquid that passes through the holding tube 62 is ensured and continues CIP processing. On the other hand, if the F-value becomes less than the predetermined value, the controller 60 may determine that some trouble has occurred and the sterility of the CIP cleaning liquid is not ensured, and may stop CIP processing. Only if the F-value becomes less than the predetermined value, instead of supplying an unsterilized cleaning liquid to the beverage supply piping 65, the unsterilized cleaning liquid may be drained from a blow valve (not shown). Subsequently, after the F-value has returned to the predetermined value, the cleaning liquid may be fed to the beverage supply piping 65.

As an example, if the pH of a beverage with which the bottle 30 is to be filled is, for example, 4 or higher and lower than 4.6, a sterilization temperature condition may be determined on the assumption that the reference temperature Tr=85° C. and Z-value=5° C. That is, the Food Sanitation Act stipulates that a bactericidal value necessary for sterilizing a beverage whose pH is 4 or higher and lower than 4.6 is equal to or greater than that of heating at 85° C. for 30 minutes ($F_{85}\geq30$). When Z=5° C. is used, at 95° C., it is possible to realize an equivalent bactericidal value by heating for 0.3 minutes (18 seconds). Therefore, the (shortest) residence time $t_1$ (minutes) required by the CIP cleaning liquid to pass through the holding tube 62 is set to be 0.3 minutes (18 seconds), and if the temperature T of the thermometer 68*b* on the outlet side maintains 95° C. or higher, it can be considered that the F-value maintains 30 or greater and the sterility of the CIP cleaning liquid is ensured. In cases where Z=8° C. and 10° C. are used in order to further increase the sterilizing effect, the (shortest) residence time t 1 (minutes) required by the CIP cleaning liquid to pass through the holding tube 62 may be respectively set to 1.7 minutes (101 seconds) and 3 minutes (180 seconds). In these cases, if the temperature T of the thermometer 68*b* on the outlet side maintains 95° C. or higher, it is considered that the F-value maintains 30 or greater and the sterility of the CIP cleaning liquid is ensured. Thus, it is possible to supply the CIP cleaning liquid whose sterility is ensured to the beverage supply piping 65.

Moreover, in this case, it is not necessary to increase the temperature of the CIP cleaning liquid that passes through the CIP circulation piping 81 to higher than 100° C. Therefore, it is possible to handle each tank disposed in the CIP circulation piping 81 as a Class-2 pressure container stipulated in the Order for Enforcement of Industrial Safety and Health Act. Thus, various facilities necessary for CIP processing can be constructed at low cost, compared with a case where each tank disposed in the CIP circulation piping 81 is a Class-1 pressure container stipulated in the Order for Enforcement of Industrial Safety and Health Act. Note that, in order to perform CIP processing more efficiently, although the cost is high, each tank and the like may be changed to Class-1 pressure containers and CIP processing may be performed by using water of 100° C. or higher.

In this way, it is possible to predetermine the (shortest) residence time $t_1$ (minutes) required by the CIP cleaning liquid to pass through the holding tube 62 based on an F-value required for sterilization of a beverage, the Z-value, and the reference temperature Tr. For example, the residence time $t_1$ is preferably 0.05 minutes or longer and 10 minutes or shorter, and more preferably 0.1 minutes or longer and 3 minutes or shorter. In order to allow each tank and the like disposed in the CIP circulation piping 81 to be a Class-2 pressure container, the reference temperature Tr is preferably lower than 100° C., and more preferably 97° C. or lower. In order to prevent the residence time $t_1$ from becoming unnecessarily long, the reference temperature Tr is preferably 87° C. or higher, and more preferably 90° C. or higher.

In the above formula for calculating the F-value, the reference temperature Tr and the Z-value can be changed in accordance with the type of a beverage that is a product liquid. For example, when the pH of the product liquid is lower than 4, the reference temperature Tr may be 65° C. and the Z-value may be 5° C. That is, it is possible to appropriately change the values to be input to the calculation formula in accordance with the microorganism growth characteristics, the distribution temperature, and the like of the product liquid, which is a green tea beverage, mineral water, a chilled beverage, or the like.

The sterilization method is not limited to the method in which the F-value is calculated as described above, and, for example, a sterilization method in which temperature and time are used in a way known to date may be used.

(Method for CIP Processing on Beverage Filling Machine)

Next, a method for CIP processing on the beverage filling machine 20 during the CIP processing will be specifically described.

In the present embodiment, regarding the beverage filling machine 20, first CIP processing for CIP processing on a first piping channel and second CIP processing for CIP processing on a second piping channel are sequentially performed. Moreover, third CIP processing for CIP processing on a third piping channel may be performed. The first piping channel, the second piping channel, and the third piping channel, which are piping channels that differ from each other, may include a common flow path in a part thereof. The first piping channel, the second piping channel, and the third piping channel each may be a flow path through which a liquid flows or may be a flow path through which a gas flows during filling of a container with a beverage.

The first piping channel is a piping channel in the beverage filling machine 20, and includes at least the beverage supply line 73. The second piping channel is a piping channel in the beverage filling machine 20, and includes at least the counter gas line 74. The third piping channel is a piping channel in the beverage filling machine 20, and includes at least the snift line 78.

Figure 5:
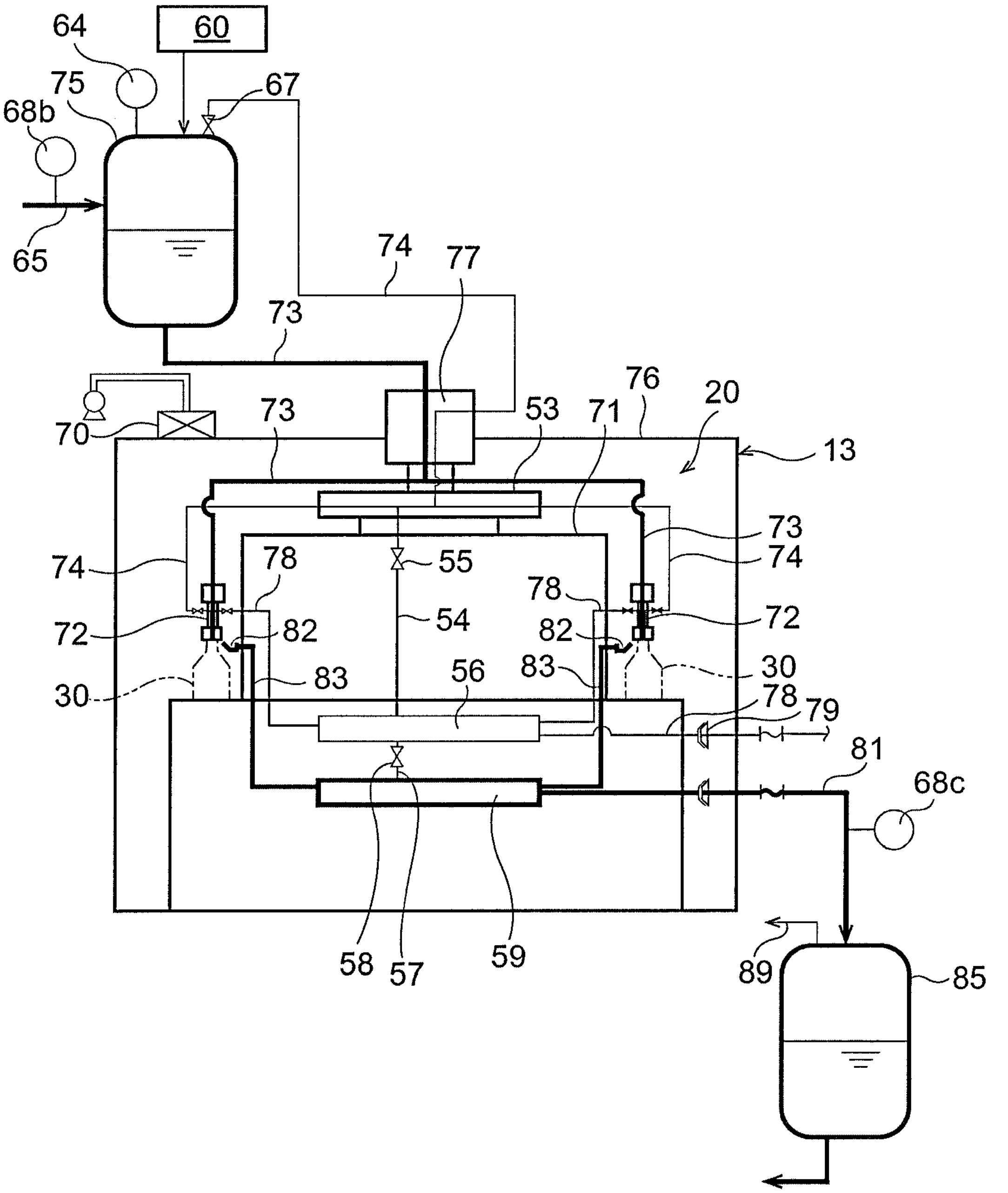
FIG. 5 is a schematic sectional view illustrating flow paths to be CIP cleaned during first CIP processing in the filling nozzle.
Figure 6:
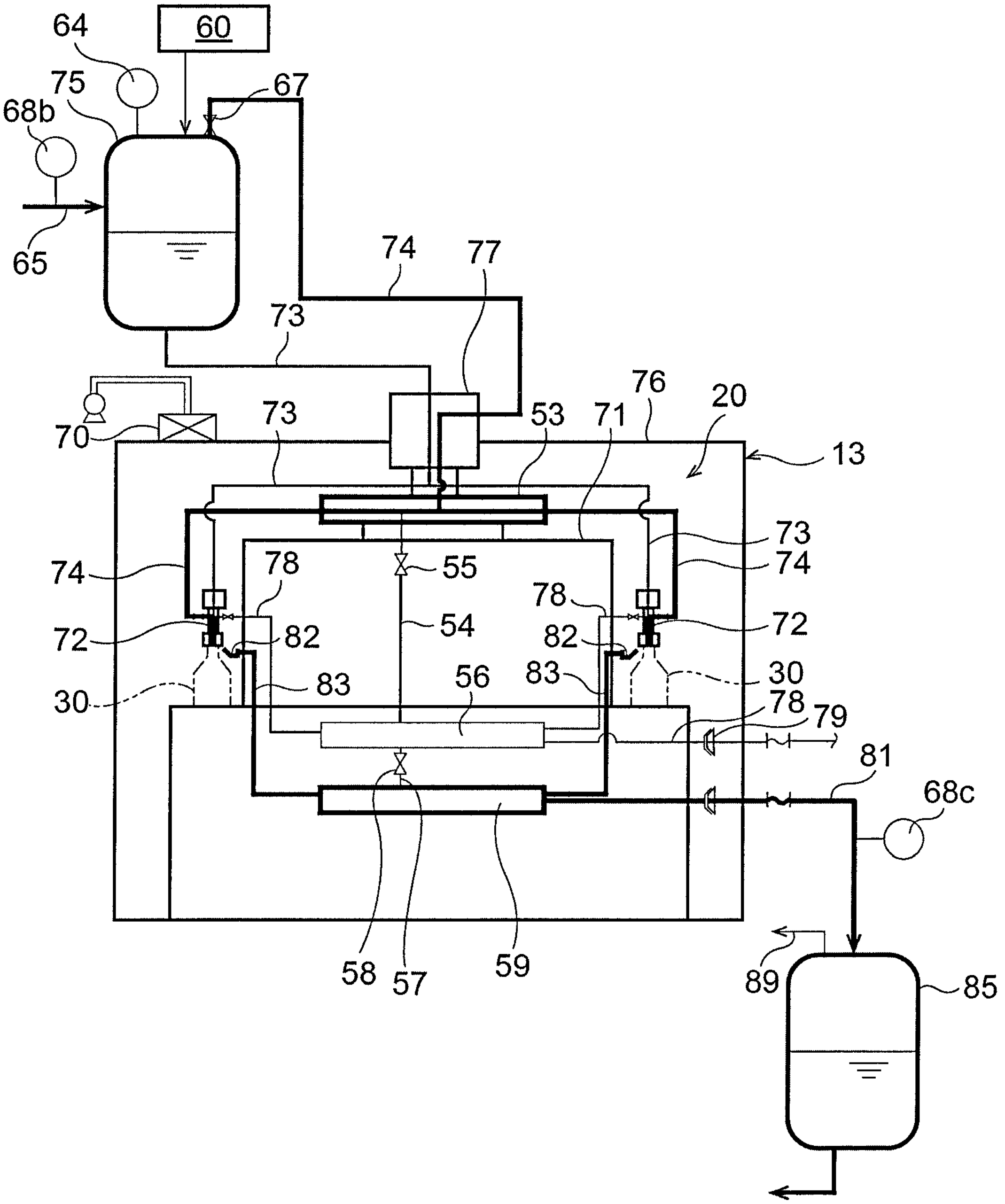
FIG. 6 is a schematic sectional view illustrating flow paths to be CIP cleaned during second CIP processing in the filling nozzle.
Figure 7:
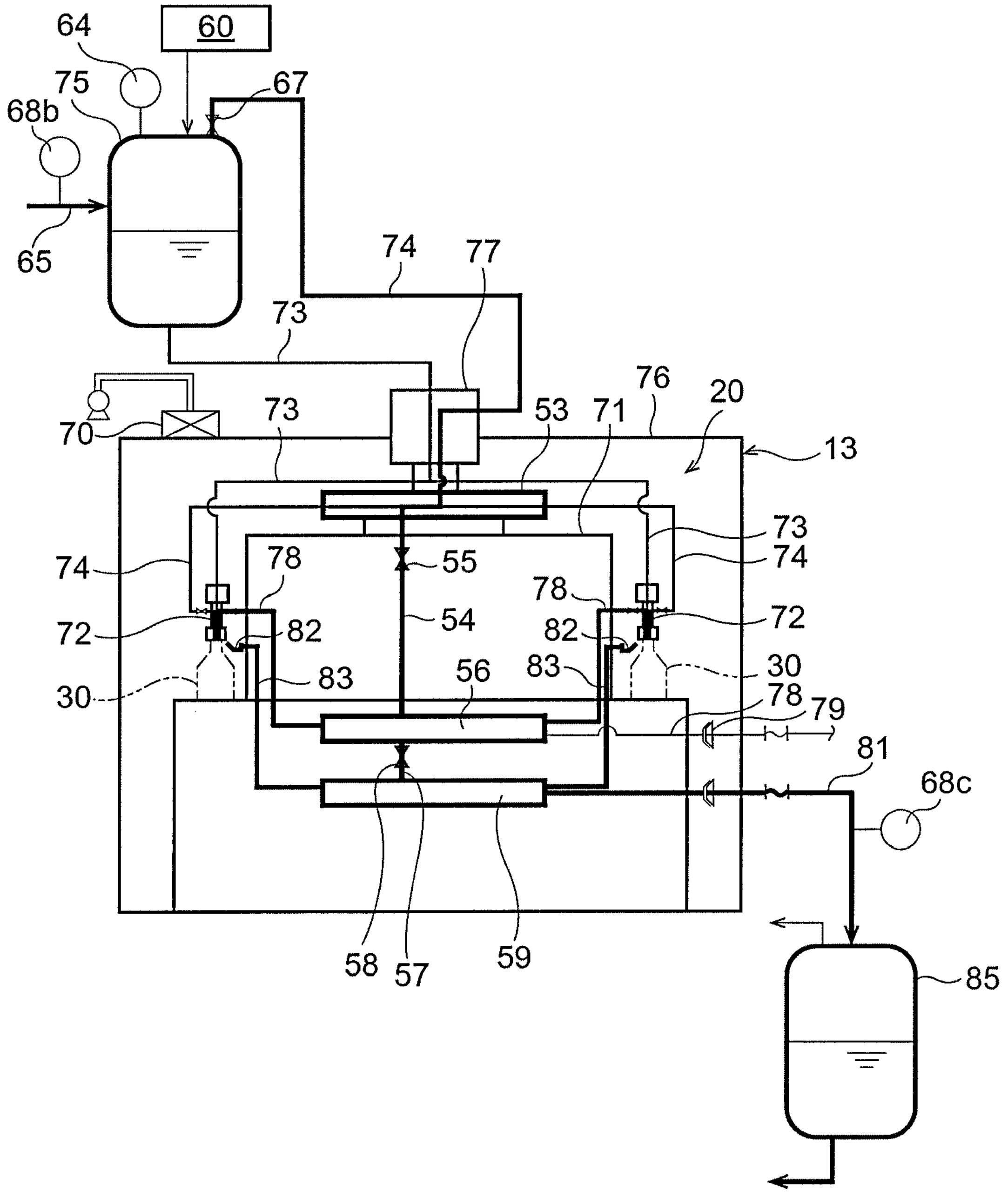
FIG. 7 is a schematic sectional view illustrating flow paths to be CIP cleaned during third CIP processing in the filling nozzle.

FIGS. 5 to 7 respectively illustrate flows of a CIP cleaning liquid when performing first CIP processing (first CIP processing step), second CIP processing (second CIP processing step), and third CIP processing (third CIP processing step). In FIGS. 5 to 7, flow paths through which the CIP cleaning liquid passes are represented by thick lines, and flow paths through which the CIP cleaning liquid does not pass are represented by thin lines.

As illustrated in FIG. 5, during the first CIP processing, the CIP cleaning liquid flows from the beverage supply piping 65, and flows into the beverage filling machine 20 via the beverage filling tank 75. In the beverage filling machine 20, the CIP cleaning liquid flows through the beverage supply line 73, the filling nozzle 72, the CIP cup 82, the CIP line 83, and the CIP manifold 59, and flows out from the beverage filling machine 20. Subsequently, the CIP cleaning liquid passes through the CIP circulation piping 81, and flows into the CIP tank 85. In this case, the first piping channel includes the beverage supply line 73, the filling nozzle 72, the CIP cup 82, the CIP line 83, and the CIP manifold 59 of the beverage filling machine 20. During the first CIP processing, the CIP cleaning liquid does not flow through the counter gas line 74 and the snift line 78. However, this is not a limitation, and the CIP cleaning liquid may flow through a part of the counter gas line 74 or a part of the snift line 78.

As illustrated in FIG. 6, during the second CIP processing, the CIP cleaning liquid flows from the beverage supply piping 65, and flows into the beverage filling machine 20 via the beverage filling tank 75. In the beverage filling machine 20, the CIP cleaning liquid flows through the counter gas line 74, the counter manifold 53, the filling nozzle 72, the CIP cup 82, the CIP line 83, and the CIP manifold 59, and flows out from the beverage filling machine 20. Subsequently, the CIP cleaning liquid passes through the CIP circulation piping 81, and flows into the CIP tank 85. In this case, the second piping channel includes the counter manifold 53, the counter gas line 74, the filling nozzle 72, the CIP cup 82, the CIP line 83, and the CIP manifold 59 of the beverage filling machine 20. During the second CIP processing, the CIP cleaning liquid does not flow through the beverage supply line 73 and the snift line 78. However, this is not a limitation, and the CIP cleaning liquid may flow through a part of the beverage supply line 73 or a part of the snift line 78.

As illustrated in FIG. 7, during the third CIP processing, the CIP cleaning liquid flows from the beverage supply piping 65, and flows into the beverage filling machine 20 via the beverage filling tank 75 and a part of the counter gas line 74. In the beverage filling machine 20, the CIP cleaning liquid flows through the counter manifold 53, the first bypass line 54, the snift manifold 56, the snift line 78, the filling nozzle 72, the CIP cup 82, the CIP line 83, and the CIP manifold 59, and flows out from the beverage filling machine 20. Subsequently, the CIP cleaning liquid passes through the CIP circulation piping 81, and flows into the CIP tank 85. In the beverage filling machine 20, the CIP cleaning liquid flows from the snift manifold 56, and flows also into the CIP manifold 59 via the second bypass line 57. In this case, the third piping channel includes the counter manifold 53, the first bypass line 54, the second bypass line 57, the snift manifold 56, the snift line 78, the filling nozzle 72, the CIP cup 82, the CIP line 83, and the CIP manifold 59 of the beverage filling machine 20. During the second CIP processing, the CIP cleaning liquid does not flow through the beverage supply line 73. However, this is not a limitation, and the CIP cleaning liquid may flow through a part of the beverage supply line 73.

The controller 60 switches between the first CIP processing, the second CIP processing, and the third CIP processing by appropriately on/off-controlling a valve (not shown) of each flow path. In this case, the first CIP processing, the second CIP processing, and the third CIP processing are respectively performed on all filling nozzles 72. Thus, an advantageous effect that it is possible to completely sterilize all flow paths without changing flow paths, pumps, and the like can be obtained.

The first CIP processing, the second CIP processing, and the third CIP processing may be performed in this order or may be performed in another order. The first CIP processing, the second OP processing, and the third CIP processing may be performed for time periods that are the same as each other or may be performed for time periods that differ from each other. The second piping channel may include both of the counter gas line 74 and the snift line 78. In this case, without performing the third CIP processing, the first CIP processing for performing CIP processing on the first piping channel and the second CIP processing for performing CIP processing on the second piping channel including the counter gas line 74 and the snift line 78 may be performed.

Flow paths included in the first piping channel, the second piping channel, and the third piping channel are not limited to the flow paths described above, and may be combinations of any flow paths in the beverage filling machine 20. In addition to the first piping channel, the second piping channel, and the third piping channel, one or more other piping channels that differ from these may be provided. In this case, in addition to the first CIP processing, the second CIP processing, and the third CIP processing, one or more CIP processing may be performed. It is preferable that all flow paths in the beverage filling machine 20 be included in at least one of a plurality of piping channels including the first piping channel, the second piping channel, and the third piping channel.

It is preferable that the flow rate of the CIP cleaning liquid that flows through the first piping channel, the second piping channel, and the third piping channel be appropriately set based on the ability of pumps, the diameter of each piping, and the like. To be specific, among the first piping channel, the second piping channel, and the third piping channel, the flow rate (L/min) of the CIP cleaning liquid that flows through one of the piping channels in which the flow rate is the smallest may be 10% or more and preferably 20% or more of the flow rate (L/min) of the CIP cleaning liquid that flows through another of the piping channels in which the flow rate is the largest. Among the first piping channel, the second piping channel, and the third piping channel, the flow rate (L/min) of the CIP cleaning liquid that flows through one of the piping channels in which the flow rate is the smallest is 100% or less and may be 90% or less of the flow rate (L/min) of the CIP cleaning liquid that flows through another of the piping channels in which the flow rate is the largest.

While sequentially CIP performing CIP processing on the inside of the beverage filling machine 20 in this way, the controller 60 monitors the temperature Ta of the inlet side and the temperature Tb of the outlet side of the beverage filling machine 20. To be specific, the temperature Ta of the inlet side of the beverage filling machine 20 may be monitored by using the thermometer 68*b*. The temperature Tb of the outlet side may be monitored by using the thermometer 68*c*. As described above, during CIP processing, only one of the first piping channel, the second piping channel, and the third piping channel is performed CIP processing and the other piping channels are not performed CIP processing. That is, during CIP processing, a pipe line in which the CIP cleaning liquid does not flow is present in the beverage filling machine 20. Regarding this, during CIP processing, the controller 60 determines that, as long as the temperatures Ta and Tb each maintain a predetermined threshold temperature or higher, a pipe line through which the CIP cleaning liquid does not flow at the time also maintains sterility and can continue CIP processing. If the pipe line is opened, as long as sterilization of the inside of the aseptic chamber 13 has been finished, even in a case where the temperature of the pipe line in which the CIP cleaning liquid does not flow decreases and the pressure of the inside of piping becomes a negative pressure, it can be said that theoretically the pipe can be maintained in an aseptic state. That is, even if a pipe line in which the CIP cleaning liquid does not flow and whose temperature is lower than the threshold temperature is present in the beverage filling machine 20, the pipe line is not opened to the atmosphere in a non-aseptic state. Therefore, entry of bacteria into the pipe line is suppressed, and it can be determined that an aseptic state is maintained. The controller 60 may stop CIP processing if the temperatures Ta or Tb becomes lower than the predetermined threshold temperature during CIP processing. The threshold temperature may be a predetermined temperature that is 85° C. or higher and lower than 100° C., and may be, for example, 90°. The CIP cleaning liquid may release heat by passing through the secondary (downstream) side of the filling nozzle 72 (the snift line 78, the snift manifold 56, the CIP manifold 59, and the CIP circulation piping 81), and the temperature Tb of the outlet side of the beverage filling machine 20 may become lower than the predetermined threshold temperature. In this case, the temperature of the CIP cleaning liquid measured by using a thermometer 68*e* (see FIG. 2), which is set in each filling nozzle 72, may be used instead of the temperature Tb of the outlet side. To be specific, the lowest of the temperatures of the CIP cleaning liquid measured by using the thermometers 68*e*, which are set in all of the filling nozzles 72, may be used as the temperature Tb. The setting position of the thermometer 68*e* is not limited to the filling nozzle 72, and the thermometer 68*e* may be set in at least one of the snift line 78, the snift manifold 56, the CIP manifold 59, and the CIP circulation piping 81.

In this way, according to the present embodiment, the first CIP processing (FIG. 5) for performing CIP processing on the first piping channel including the beverage supply line 73, the second CIP processing (FIG. 6) for performing CIP processing on the second piping channel including the counter gas line 74, and the third CIP processing (FIG. 7) for performing CIP processing on the third piping channel including the snift line 78 are performed. Thus, the beverage filling machine 20 for a carbonated beverage can be performed CIP processing efficiently and speedily. That is, in the beverage filling machine 20 for a carbonated beverage, many flow paths are present in the vicinity of the filling nozzle 72 compared with a filling nozzle for a non-carbonated beverage and have a complex structure. Therefore, it is difficult to fill all flow paths that are present in the vicinity of the filling nozzle 72 simultaneously with the CIP cleaning liquid. This is because, if all flow paths that are present in the vicinity of the filling nozzle 72 are attempted to be filled with the CIP cleaning liquid, the abilities of the pumps 51, 52, 91, and the like that are present in the beverage supply piping 65 and the CIP circulation piping 81 may be insufficient or may be affected by the pressure loss of each piping. In this case, although it may be considered to convert facilities by, for example, reinforcing the pumps, increasing the diameter of piping, increasing the size of the valves, these measures are not realistic in view of cost and the like. According to the present embodiment, during CIP processing, piping in the beverage filling machine 20 is divided into a plurality of piping channels, and these piping channels are sequentially performed CIP processing. Thus, without considerably converting the beverage filling system 10, it is possible to perform CIP processing on the beverage filling machine 20 for a carbonated beverage efficiently.

In the above description, a case where CIP processing and SIP processing are simultaneously performed without additionally performing SIP processing has been described as an example (CSIP processing). This is not a limitation, and SIP processing may be performed after CIP processing. This SIP processing is processing for sterilizing the inside of a flow path through which a beverage is to pass before starting an operation of filling a container with the beverage. The SIP processing is performed by, for example, causing heat steam or hot water to flow through a flow path that has been cleaned by the CIP cleaning. Thus, the inside of the flow path through which a beverage is to pass is sterilized to be in an aseptic state.

In the above description, CSIP processing, with which cleaning and sterilization are simultaneously performed while circulating an alkaline cleaning liquid or an acid cleaning liquid, has been described as an example of CIP processing. However, in a rinsing step after circulating a CIP cleaning liquid, by supplying water whose sterility is ensured to the beverage supply piping 65, SIP processing may be performed while washing away the CIP cleaning liquid with the water.

According to the present embodiment, the heater 93 and the holding tube 62 are provided in the CIP circulation piping 81, and a CIP cleaning liquid heated by the heater 93 is set in such a way as to pass through the holding tube 62 while spending a predetermined residence time or longer. Thus, it is possible to ensure the sterility of the CIP cleaning liquid and to supply the CIP cleaning liquid whose sterility is ensured to the beverage supply piping 65.

According to the present embodiment, the thermometer 68*b* is provided on the outlet side of the holding tube 62 of the CIP circulation piping 81, and the controller 60 monitors the F-value calculated based on the temperature of the thermometer 68*b*. Thus, the controller 60 can determine that, as long as the F-value maintains a predetermined value or greater, the sterility of the CIP cleaning liquid that passes through the holding tube 62 is ensured. Moreover, by controlling the sterility of the CIP cleaning liquid by using the F-value, it is not necessary to perform CIP processing for an unnecessarily long time, and thus it is possible to reduce the product switching time of the beverage filling system 10 and to increase the production capacity.

In the above description, as the beverage filling system, the beverage filling system 10 that uses an aseptic filling method has been described as an example. However, this is not a limitation. The beverage filling system may be, for example, a beverage filling system that uses a hot filling method for filling a container with a beverage under a high temperature of 55° C. or higher and 95° C. or lower. The present disclosure is applicable to any beverage filling system for which SIP processing (deactivation of microorganisms) is performed after CIP processing, such as a chilled beverage filling system, an alcohol beverage filling system, or the like.

It is possible to appropriately combine a plurality of elements disclosed in the embodiment and modifications described above, as necessary. Alternatively, some elements may be omitted from all of the elements disclosed in the embodiment and modifications described above.

The invention claimed is:

1. A beverage filling system for filling a container with a carbonated beverage, comprising:

beverage supply piping that supplies the carbonated beverage;

a beverage filling machine that is coupled to the beverage supply piping;

a controller that controls the beverage filling system;

a first piping channel; and a second piping channel, wherein the beverage filling machine includes a filling nozzle and a beverage supply line, a counter gas line, and a snift line each of which is coupled to the filling nozzle, wherein the first piping channel includes the beverage supply line, the filling nozzle and a CIP line, and does not include the counter gas line, wherein the second piping channel includes the counter gas line, the filling nozzle and the CIP line, and does not include the beverage supply line, and wherein the controller causes a first CIP processing to be performed on the first piping channel by using an alkaline cleaning liquid or an acid cleaning liquid, and causes a second CIP processing to be performed on the second piping channel after or before the first CIP processing by using the alkaline cleaning liquid or the acid cleaning liquid, wherein during the first CIP processing, the alkaline cleaning liquid or the acid cleaning liquid flows from the beverage supply piping into the beverage filling machine, in the beverage filling machine, the alkaline cleaning liquid or the acid cleaning liquid flows through the beverage supply line, the filling nozzle, and the CIP line in this order, without flowing through the counter gas line, and flows out from the beverage filling machine, and during the second CIP processing, the alkaline cleaning liquid or the acid cleaning liquid flows from the beverage supply piping into the beverage filling machine, in the beverage filling machine, the alkaline cleaning liquid or the acid cleaning liquid flows through the counter gas line, the filling nozzle, and the CIP line in this order, without flowing through the beverage supply line, and flows out from the beverage filling machine.

2. The beverage filling system according to claim 1, further comprising a third piping channel:

wherein the third piping channel includes the snift line, the filling nozzle and the CIP line, and does not include the beverage supply line, and wherein the controller causes a third CIP processing to be performed on the third piping channel by using the alkaline cleaning liquid or the acid cleaning liquid.

3. The beverage filling system according to claim 2, wherein, the smallest flow rate of a cleaning liquid through the first piping channel, the second piping channel, and the third piping channel is between 10% and 100% of the largest flow rate of a cleaning liquid through the first piping channel, the second piping channel, and the third piping channel.

4. The beverage filling system according to claim 1, further comprising:

CIP circulation piping that is coupled to the beverage filling machine, that feeds a cleaning liquid flowed out from the beverage filling machine during CIP processing toward the beverage supply piping, and that circulates the cleaning liquid, wherein the cleaning liquid is heated to a temperature of 85° C. or higher and lower than 100° C.

5. The beverage filling system according to claim 1, wherein, during CIP processing, the controller monitors whether a temperature of an inlet side of the beverage filling machine and a temperature of an outlet side of the beverage filling machine each maintain a predetermined threshold temperature or higher.

6. A CIP processing method for performing CIP processing on a beverage filling system for filling a container with a carbonated beverage, the beverage filling system including beverage supply piping that supplies the carbonated beverage, a beverage filling machine that is coupled to the beverage supply piping, a first piping channel and a second piping channel, the beverage filling machine including a filling nozzle and a beverage supply line, a counter gas line, and a snift line each of which is coupled to the filling nozzle, the first piping channel includes the beverage supply line, the filling nozzle and a CIP line, and does not include the counter gas line, the second piping channel includes the counter gas line, the filling nozzle and the CIP line, and does not include the beverage supply line, the CIP processing method comprising:

a first CIP processing step of performing CIP processing on a first piping channel by using an alkaline cleaning liquid or the acid cleaning liquid; and a second CIP processing step of performing CIP processing on a second piping channel after or before the first CIP processing step by using the alkaline cleaning liquid or the acid cleaning liquid, wherein during the first CIP processing step, the alkaline cleaning liquid or the acid cleaning liquid flows from the beverage supply piping into the beverage filling machine, in the beverage filling machine, the alkaline cleaning liquid or the acid cleaning liquid flows through the beverage supply line, the filling nozzle, and the CIP line in this order, without flowing through the counter gas line, and flows out from the beverage filling machine, and during the second CIP processing step, the alkaline cleaning liquid or the acid cleaning liquid flows from the beverage supply piping into the beverage filling machine, in the beverage filling machine, the alkaline cleaning liquid or the acid cleaning liquid flows through the counter gas line, the filling nozzle, and the CIP line in this order, without flowing through the beverage supply line, and flows out from the beverage filling machine.

7. The CIP processing method according to claim 6, wherein the beverage filling system further comprises a third piping channel:

the third piping channel includes the snift line, the filling nozzle and the CIP line, and does not include the beverage supply line, the CIP processing method further comprising a third CIP processing step of performing CIP processing on the third piping channel by using the alkaline cleaning liquid or the acid cleaning liquid.

* * * * *